United States Patent [19] [11] 4,054,065
Lemon [45] Oct. 18, 1977

[54] MULTIPLE AXLE DRIVE MECHANISM
[75] Inventor: Robert William Lemon, Farmington, Mich.
[73] Assignee: Borg-Warner Corporation, Chicago, Ill.
[21] Appl. No.: 602,944
[22] Filed: Aug. 7, 1975
[51] Int. Cl.² .................. F16H 1/44; F16H 37/06; B60K 17/34; F16D 43/00
[52] U.S. Cl. .................. 74/711; 180/44 R; 192/48.1; 74/665 G; 74/665 K
[58] Field of Search ............ 180/23, 44 R, 49; 192/35, 36, 41 R, 41 A, 42, 43, 44, 45, 48.1, 48.3, 48.4, 48.5-48.9, 48.91, 48.92, 49, 50; 74/665 A-665 K, 710, 710.5, 711, 650

[56] References Cited
U.S. PATENT DOCUMENTS

| 2,796,941 | 6/1957 | Hill | 180/44 R |
|---|---|---|---|
| 2,851,115 | 9/1958 | Buckendale | 180/23 |
| 2,853,890 | 9/1958 | Kelbel | 74/665 |
| 3,055,471 | 9/1962 | Warn | 192/36 X |
| 3,283,611 | 11/1966 | Weismann | 74/650 |
| 3,581,597 | 6/1971 | Riersgaard | 192/44 R X |
| 3,941,199 | 3/1976 | Williams | 180/44 R |

FOREIGN PATENT DOCUMENTS

| 899,607 | 6/1945 | France | 180/44 R |

Primary Examiner—Samuel Scott
Assistant Examiner—Lance W. Chandler
Attorney, Agent, or Firm—Robert L. Zieg

[57] ABSTRACT

A torque transfer mechanism for transferring drive to a pair of tandem driving axles of a vehicle including two double-acting one-way devices each comprised of a plurality of wedging elements and an input shaft having a drive race thereon in operative engagement with the wedging elements. A pair of outer driven races are each adapted to be engaged by said wedging elements and each are drivingly connected to one of a pair of concentric output shafts. Each of said one-way devices has a cage member containing said wedging means and friction means connected to said cage member and in frictional engagement with said driven races. Interlock means interconnect the cage members and permit limited angular displacement therebetween whereby when each of said output shafts are rotating at the same speed said drive race will engage said wedging elements with said driven races to provide positive drive to each of said output shafts and the limited angular displacement of said cages will allow either of said output shafts to rotate faster than the other output shaft by releasing said wedging engagement so that at all times when there is a difference in speed between the output shafts, driving torque is applied to the slower rotating output shaft.

8 Claims, 7 Drawing Figures

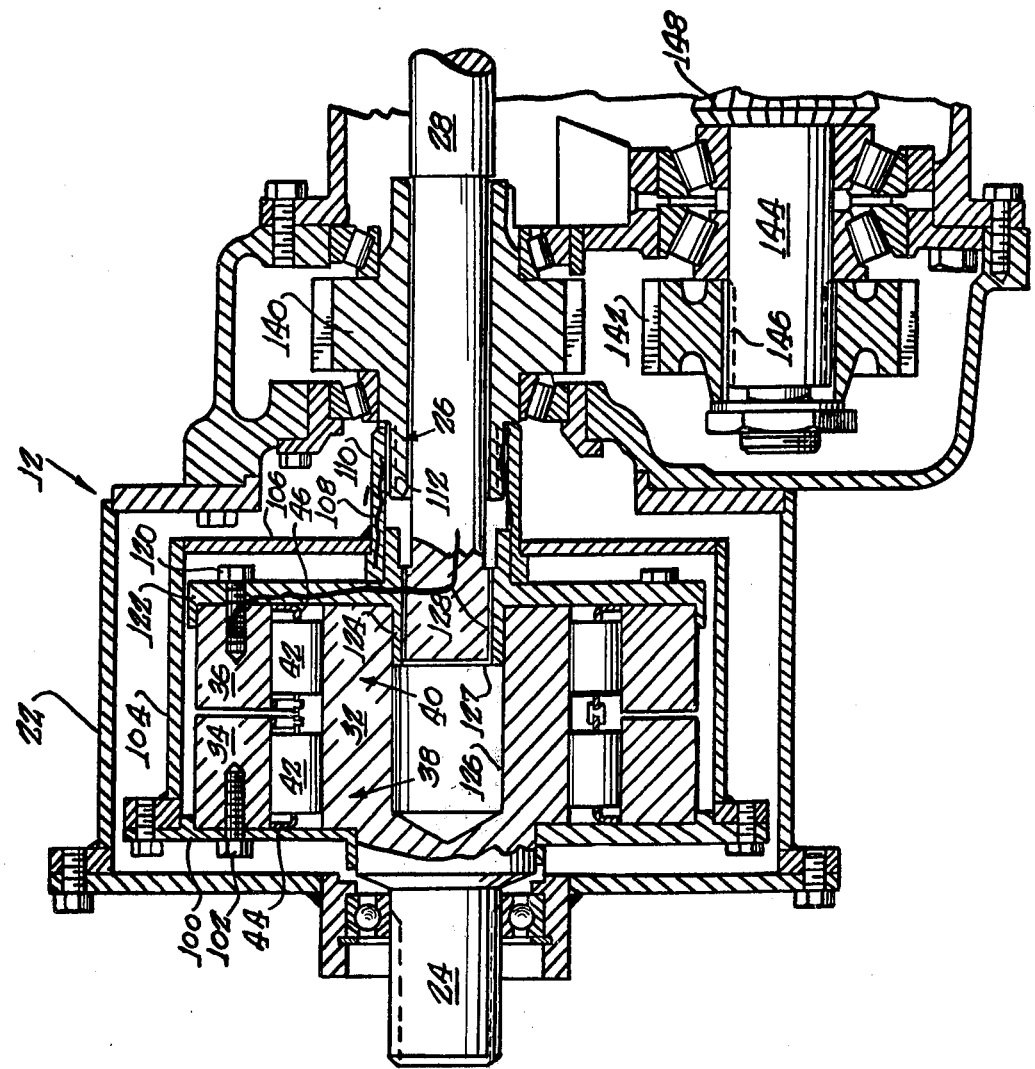

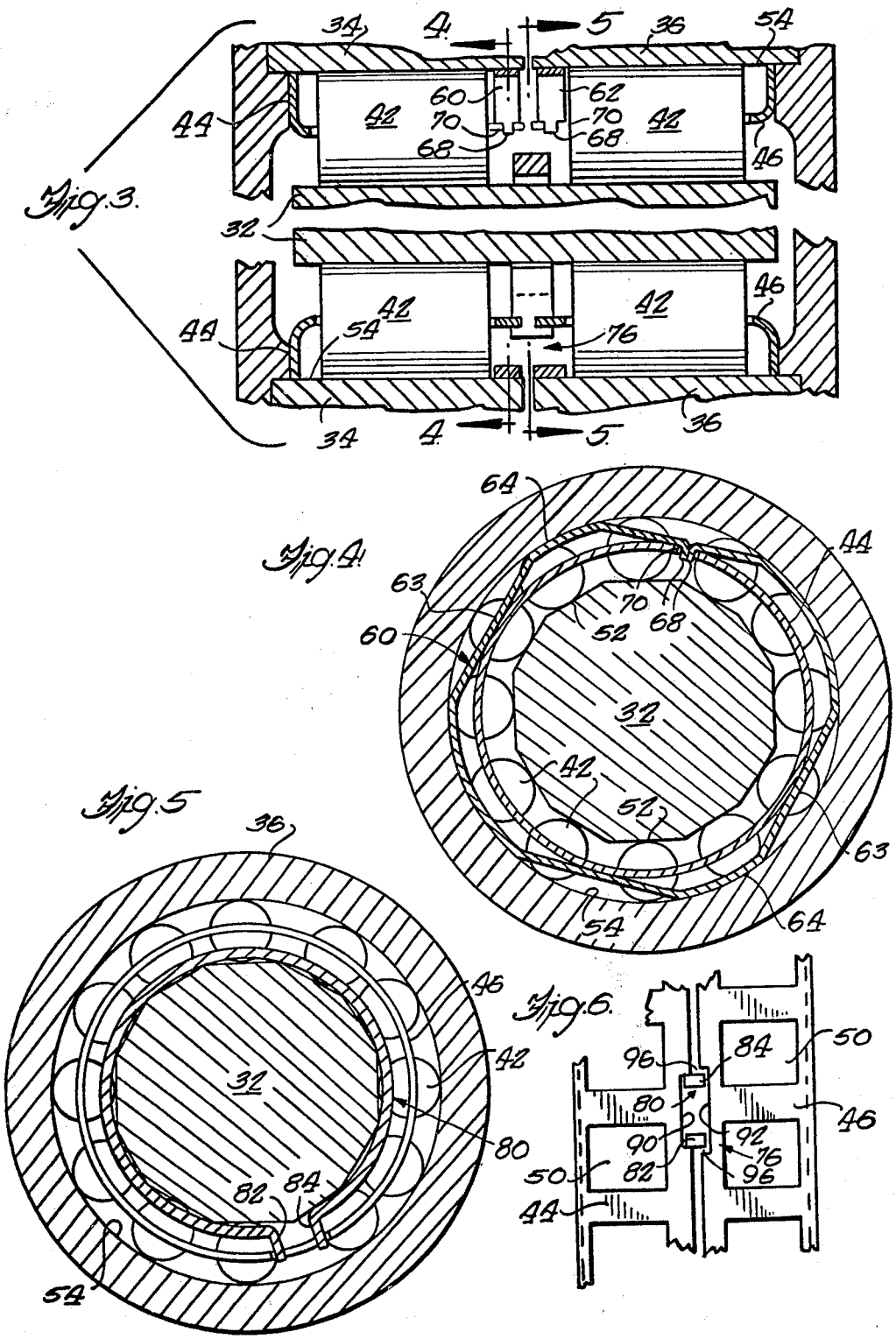

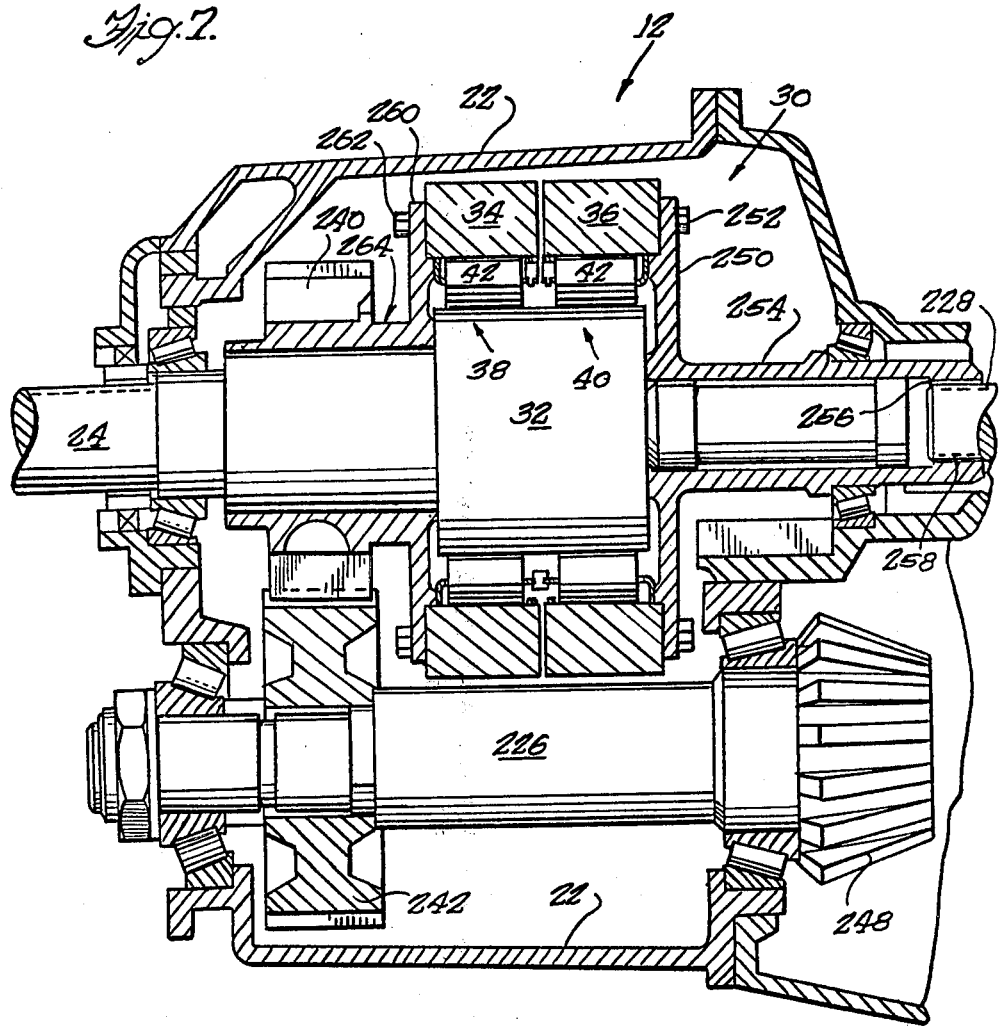

4,054,065

MULTIPLE AXLE DRIVE MECHANISM

BACKGROUND OF THE INVENTION

It has been known in the prior art to provide for utilization of roller clutch devices in a torque transfer mechanism to drive tandem parallel driving axles. The use of the one-way structure simplifies the mechanism used to split the driving torque between the axles in that the more complex standard differential mechanism, such as a bevel gear differential, is replaced by the one-way device. However, the use of the one-way device in this configuration in which normally a pair of roller clutches are utilized induces a problem in that improper relationships can develop due to one of the one-way devices locking up in the wrong direction of relative rotation. This has lead to a structure wherein forward and reverse roller clutches are used and a shift lever must be provided to selectively activate one or the other of the one-way devices. The present invention provides a unique solution to this problem by eliminating the necessity for a shifting mechanism.

SUMMARY OF THE INVENTION

The present invention provides a unique one-way engaging mechanism for transferring torque between a vehicle engine and two tandem driving axles. The problem mentioned in the foregoing statement of the improper operation which can develop unless a shifting mechanism is utilized is solved by the use of a cage interlock mechanism for the one-way device. That is, when one of the axles is turning faster than the other, the appropriate one-way engaging device will be put into its neutral phase allowing overrun of the faster driving axle. However, due to the cage interlock mechanism which comprises a unique interconnection between the cages of the one-way devices will prevent the cage of the overrunning axle from moving beyond the neutral phase into engagement in the opposite direction which would produce a negative torque input into the input shaft from the wheels of the faster turning axle.

In addition the present invention utilizes a pair of double-acting one-way devices or roller clutches whereby either of the tandem axles may overrun the other axle when the wheels of that particular axle slip as when on ice and torque is automatically transferred to the other axle which is turning slower and not slipping or spinning. The slipping axle will continue to drive with its maximum tractive effort thus both axles are capable of delivering their maximum tractive effort at all times. This is a distinct advantage over standard differentials which can deliver only the torque equal to the axle with the least tractive effort.

BRIEF DESCRIPTION OF THE DRAWINGS

The objects and advantages of this invention will become apparent to those skilled in the art upon careful consideration of the specification herein, including the drawings, wherein:

FIG. 2 is an enlarged sectional view showing details of a torque transfer mechanism embodying the principles of the present invention;

FIG. 3 is a further enlarged sectional view of the one-way devices of FIGS. 1 and 2;

FIG. 4 is a sectional view taken along the lines 4—4 of FIG. 3;

FIG. 5 is a sectional view taken along the lines 5—5 of FIG. 4;

FIG. 6 is a partial sectional view showing details of the roller cage structure for the mechanism of FIGS. 2 and 3; and FIG. 7 is a view similar to FIG. 2 showing a modified form of the present invention.

BRIEF DESCRIPTION OF THE PREFERRED EMBODIMENT

Figure 1:
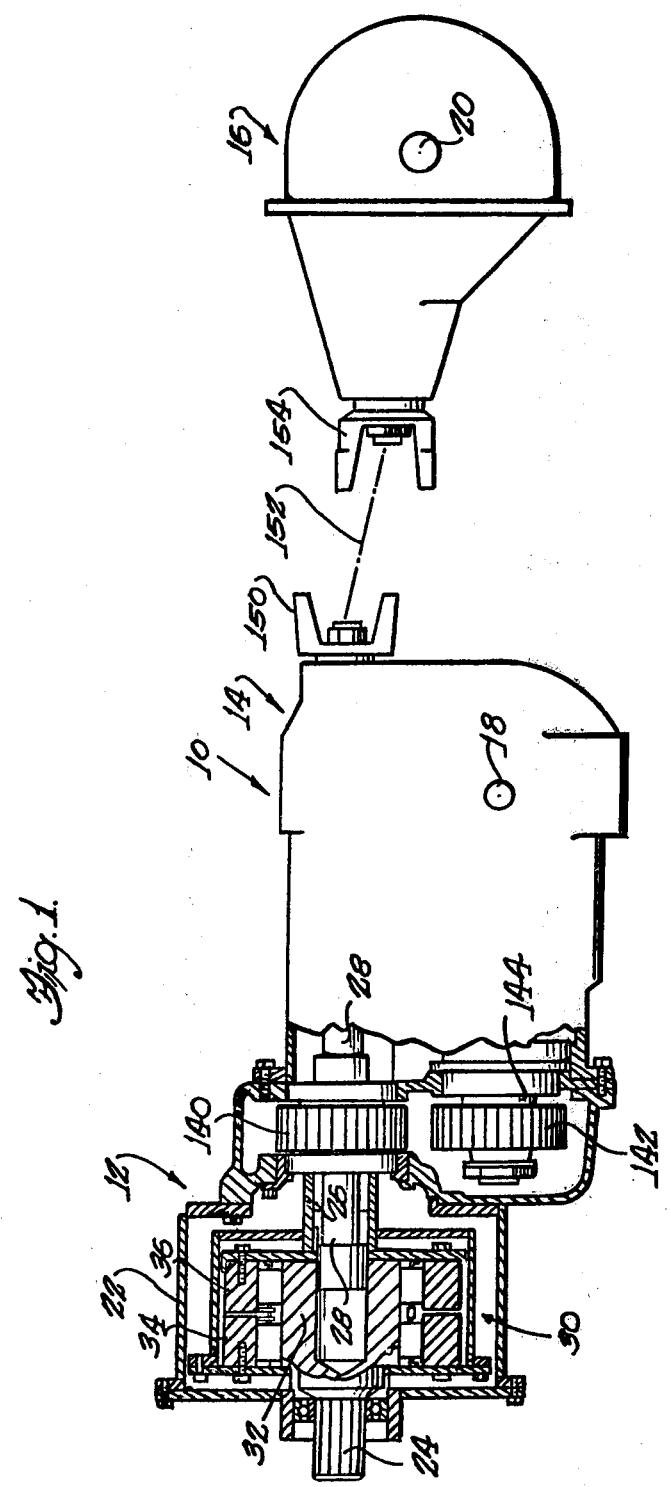
FIG. 1 is a partial sectional view of a torque transfer mechanism for driving a pair of tandem driving vehicle axles.

Referring to FIG. 1, there is illustrated an axle mechanism 10 of the type utilized in larger vehicles wherein two tandem parallel driving axles are to be driven. The axle mechanism 10 includes a torque transfer device 12, a first driving axle 14, and a second driving axle 16 each of the driving axles 14 and 16 including a differential mechanism (not illustrated) to provide for drive to a pair of axle shafts to which are attached the vehicle's driving wheels. Axle 14, for example, drives axle shafts concentric with the axis 18, and axle 16 drives a differential mechanism which will drive axles mounted on an axis 20.

The torque transfer mechanism 12 includes a housing 22. Mounted within the housing 22 is an input shaft 24 and a pair of concentric output shafts 26 and 28, the output shaft 28 being internal of the hollow output shaft 26. Provided between the input shaft 24 and output shafts 28 and 26 is the unique roller clutch or torque transfer device 30 of the present invention.

Referring to FIGS. 2 and 3, the one-way device 30 includes an inner or drive race or cam element 32 and a pair of outer race elements or driven races 34 and 36. Mounted between the race 32 and races 34 and 36 are a pair of roller mechanisms 38 and 40. The roller mechanisms each include a plurality of wedging means or rollers 42 where are adapted to be engaged with races 34 and 36. The roller mechanism 38 includes a cage member 44 and the roller mechanism 40 includes a cage member 46.

As viewed in FIG. 6, the cage members 44 and 46 closely adjoin one another and include a plurality of openings 50 approximately the size of the rollers 42 to guide and support the rollers and maintain spacing therebetween.

As viewed in FIG. 4, it can be seen that the drive race 32 has a plurality of cam surfaces 52 thereon adapted to engage the rollers 42. The driven races 34 and 36 have an inner cylindrical race surface 54 adapted to engage rollers 42. Further, as illustrated in FIGS. 2 and 3, a pair of friction means or drag springs 60 and 62 are provided for roller mechanisms 38 and 40 respectively. The drag springs mechanisms 60 and 62 are identical in construction. As viewed in FIG. 4, it can be seen that the drag spring 60 is made with relatively flat portions 63 which may be four in number separated by curved surface portions 64. The curved surface portions 64 have frictional engaging contact with the surface 54 of outer races 34 and 36. The number of curved surface portions 64 may be varied to provide appropriate frictional forces between the drag springs and surface 54. The flexible springs 60 and 62 have terminal portions 68 thereon which extend radially inwardly and have mating engagement with one another. These portions 68 are engaged in apertures 70 previded in the cage members 44 and 46 respectively. Terminal portions 68 provide a driving connection between the drag springs 60 and 62 and cages 44 and 46 respectively. Thus, due to the frictional engagement between the races 34 and 36 and cages 44 and 46, the cages have a tendency to be driven in a direction corresponding to the direction of relative rotation of races 34 and 36.

The cages 44 and 46 are flanged on the outer ends and piloted on the outer race surface 54 to hold the cages concentric with the outer races 34 and 36 to accurately position the rollers so that the maximum number of rollers will share the load.

Also provided in connection with the cages 44 and 46 is a unique cage interlock mechanism 76 comprised of a circular "C" type spring 80 which has terminal portions 82 and 84 thereon which extend radially outwardly. The spring 80 is of a flexible material, for example steel, and has a resiliency tending to open the spring to an increased diameter. As illustrated in FIG. 5, the spring 80 has a loose frictional connection with the race 32, although such connection is not necessary. The interlock mechanism 76 is for the purpose of limiting the angular displacement which can take place between cages 44 and 46. As illustrated in FIG. 6, the cage 44 has on the right-hand side thereof a slot 90 formed therein of a predetermined circumferential length. The cage 46 has a circumferential slot 92 formed therein on the left-hand side thereof which has a circumferential length slightly greater than that of slot 90. Engaged between and within the slots 90 and 92 are terminal portions 82 and 84 of the spring 80.

As will be seen in FIG. 6, a clearance as indicated at 96 is provided between terminal portions 84 and 82 of the spring 80 and the ends of the slot 92. The clearances 96 provide a lost motion between the cages 44 and 46, permitting a slight freedom of angular displacement between the cages. However, when the clearance 96 has been taken up, further angular displacement between cages 44 and 46 is resisted by the "C" shaped spring 80, so that only limited angular displacement between cages 44 and 46 is permitted as is necessary in the operation of the device as will appear from the following description.

The race 34 is connected to a radially extending flange 100 as, for example, by bolts 102. Flange 100 is supported for rotation on the input shaft 24 and has connected therewith a driven element or drum 104 which extends axially. The drum 104 is connected, as for example by welding, to a radially extending flange 106 which in turn is connected, as for example by welding, to an axially extending hollow drive sleeve 108. The drive sleeve 108 has splines 110 thereon which mate with splines 112 on output shaft 26 to provide for drive between said sleeve 108 and the output shaft 26.

The face 36 is connected, as for example, by bolts 120 to a radially extending flange 122 which has a hollow hub 124 thereon extending into a bore 126 in input shaft 24 whereby the flange 122 is supported for rotational movement with respect to the race 32. Internal of the hollow hub 124 are splines 127. Splines 127 are connected to splines 128 formed on the output shaft 28.

Output shaft 26 has an output gear 140 formed thereon which is connected through suitable gearing (not illustrated) to a drive gear 142 to provide for drive of a front propeller shaft 144. The front propeller shaft 144 is splined to the drive gear 142 as indicated at 146. The propeller shaft 144 has a pinion gear 148 thereon adapted to drive the ring gear of a differential mechanism for the driving axle 14.

As illustrated in FIG. 1, the output shaft 28 drives an output flange 150 which is connected by a propeller shaft 152 shown in schematic form. The propeller shaft 152 drives an input means 154 for the rear driving axle 16 so that a drive connection from output shaft 28 is provided to drive rear axle mechanism 16. The differential mechanism and appropriate ring and pinion gears are not illustrated for the axle 16 since these are of standard configuration.

The operation of the above-described device is as follows. When a driving input is provided from the engine to input shaft 24, drive race 32 will turn with input shaft 24 and will wedge rollers 42 into wedging engagement between race 32 and driven races 34 and 36, due to cam means 52 provided on race 32. Thus, races 34 and 36 will be driven in the same direction as the input shaft 24 and will drive concentric output shafts 26 and 28 in the forward direction. The drive connections and the gearing such as gearing 140 and 142 and the ring and pinion gears in each of the drive axles 14 and 16 are designed to have identical drive ratios whereby normally the torque will be split between the two output shafts since they are rotating at the same speed. However, when one output shaft speeds up as would be the case wherein the driving wheels of one of the tandem axles would hit slippery pavement, its driven race will turn faster than input shaft 24 and the other driven race. Through the frictional contact between the driven race and rollers 42, the faster rotating race can overrun the input shaft 24 and drive race 32 by releasing the wedging engagement of the rollers 42. In the released condition of axle 14 and the race element 34 for example, all the torque will be transferred to race element 36 and the slower turning output shaft 28 until the wheels which are spinning or rotating faster slow down to the same speed as those driven by output shaft 28 at which time the rollers 42 will again be moved into wedging engagement as assisted by the drag spring 60 for example. As will be apparent, the torque is split between the driving axles until one of the driving axles begins to spin at which time the torque is automatically transferred to the slower driving axle which has greater frictional contact between its wheels and the pavement.

When one of the axles begins to overspeed as described above, the overrunning function is provided since the frictional contact between the particular driven race and its drag spring will tend to pull the cage mechanism and the rollers 42 out of wedging engagement. At this stime, the other rollers and cage are positioned to remain in wedging engagement to keep the transmission of torque flowing. The novel cage interlock mechanism 76 will permit angular displacement between cages 44 and 46 to allow for movement of one of the roller mechanisms 38 or 40 to its disengaged or neutral position which is illustrated as, for example, in FIG. 2 where the rollers are shown approximately in the middle of the cams 52 in an angular sense, whereby the outer race can overrun the inner race. The angular displacement permitted between the cages 44 and 46 by the unique interlock mechanism 76 will prevent the overrunning outer race element from moving its cage, as for example, cage 46 to a position which would carry the rollers into locking engagement in the reverse sense or other direction of relative rotation which would provide a drive from the spinning wheels back to the input shaft 24 which would provide an opposing torque to the driving torque on input shaft 24. However, this condition cannot occur because the unique interlock mechanism of cages 44-46 will prevent lock-up of the overrunning unit in the opposite direction.

Thus, as will appear from the above description, the unique one-way driving device 30 provides for driving a pair of tandem drive axles and allowing either axle to overrun the other when it spins and automatically transfers torque to the axle rotating slower and having maximum traction. Thus, in a very simple and novel manner, the torque will be appropriately distributed between the axles to provide for maximum propelling force for the vehicle under all conditions.

In addition, it will be seen that due to the unique action and design of the double-acting one-way devices, having the cam means on the inner race and the cylindrical cam on the outer race, operation is possible in both forward and reverse with no shifting required to engage particular race elements as is known in the prior art. In addition, the unique drag spring means are connected through a frictional driving connection to the outer race elements, whereby the unit is speed sensitive to the output shafts as is necessary to provide the anti-spin function.

Referring to FIG. 7 a modified version of the present invention is illustrated. Like parts of FIG. 7 to those of FIGS. 1, 2 and 3 carry like numerals. As in the FIG. 2 construction, input shaft 24 has an inner drive race 32 formed thereon. The one-way device 30 is identical to that of FIGS. 2 and 3 insofar as race 32, races 34 and 36, and roller mechanism 38 and 40 are concerned. Outer race 36 is connected to drive an output shaft 228 which is connected to drive the rear axle 16. Outer race 34 drives a second output shaft 226.

Outer race 36 is connected to a radial flange 250, as for example by bolts 252, and flange 250 is integral with a hollow drive sleeve 254. Drive sleeve 254 has splines 256 thereon in engagement with splines 258 on output shaft 228, to drive output shaft 228 thereby.

Outer race 34 is connected to a radial flange 260, as for example by bolts 262, which is integral with a drive sleeve 264. Also integral with the sleeve 264 is an output gear 240. Drive sleeve 264 is journalled on input shaft 24. Output gear 240 meshes with a driven gear 242 on a propeller or output shaft 226. Also formed on the shaft 226 is a pinion gear 248 which in turn drives the differential mechanism (not illustrated) for axle 14.

The essential difference then between the structure of FIG. 7 and that of FIG. 2 is that output shafts 226 and 228 are not concentric or coaxial. Propeller shaft 226 is mounted in the same space as device 30 in a radial sense, being located in housing 22 below device 30 and generally axially aligned therewith. Since the outputs are driven from opposite sides of the device 30, as compared to the embodiment of FIG. 2, a shortened axial length is provided between input shaft 24 and axles 14 and 16.

The operation of the torque transfer device 12 of FIG. 7 is identical to that described above for the device of FIGS. 1 and 2.

An additional advantage of the devices of FIGS. 1-7 is that when both output shafts tend to overrun the input both roller cages are driven by the normally driven races into a locking position whereby the faster driven axle will drive the input through the roller clutch thus providing engine braking.

Various features of the invention have been particularly shown and described; however, it should be obvious to one skilled in the art that modifications may be made therein without departing from the scope of the present invention.

What is claimed is:

1. A clutch mechanism for transferring drive to a pair of concentric output shafts from an input shaft, each of said output shafts connected to drive a drive axle said clutch mechanism including two one-way devices each comprises of a plurality of wedging elements, said input shaft extending on one side of said clutch mechanism and said output shafts extending from the other side of said clutch mechanism, one of said output shafts having an output gear thereon and said other output shaft extending through said output gear said input shaft having an inner drive race thereon in operative engagement with the wedging means of each said one-way devices, a pair of outer driven races surrounding said drive race for said one-way devices each adapted to be engaged by said wedging elements of one of said devices and each being drivingly connected to one of said concentric output shafts, each of said one-way devices having a cage member containing said wedging means, friction means connected to said cage member and in frictional engagement with each of said outer driven races, interlock means interconnecting the cage members of said devices and permitting limited angular displacement therebetween whereby when each of said output shafts are rotating at the same speed said drive race will engage said wedging elements with said driven races to provide positive drive to each of said output shafts and whereby said limited angular displacement of said cages will allow either of said output shafts to rotate faster than the other output shaft and release said wedging engagement whereby at all times driving torque is applied to the slower rotating output shaft.

2. A mechanism as claimed in claim 1, wherein said friction means is comprised of a resilient substantially circular spring, said spring having terminal portions in operative association with said cages.

3. A mechanism as claimed in claim 1, wherein said interlock means is comprised of a circumferentially extending slot formed in facing sides of said cages, one of said slots being of greater circumferential length than the other, spring means comprising a resilient circular spring having teminal portions with radially extending ends theron engaging in said slots whereby interaction of said terminal portions and said slots provides said limited angular displacement of said cages.

4. A mechanism as claimed in claim 1 wherein said drive race has a plurality of cam means thereon and said driven races have a smooth cylindrical inner race surface thereon in engagement with said rollers.

5. A torque transmission mechanism for a multiple drive axle vehicle to transfer torque from a source of power to a pair of tandem parallel drive axles; the combination wherein the torque transmission mechanism includes a housing, an input shaft supported by said housing, first and second concentric output shafts supported by said housing and each connected to drive one of said axles, means in said housing for transferring torque from said input shaft to said output shafts, said input shaft extending on one side of said torque transfer means and said concentric output shafts extending from the other side of said torque transfer means, one of said output shafts having an output gear thereon and said other output shaft extending through and rotatable within said output gear, said means including two one-way devices each comprised of a plurality of wedging elements, said input shaft having an inner drive race thereon in operative engagement with the wedging means of each said one-way devices, a pair of outer driven races for said one-way devices surrounding said drive race and each adapted to be engaged by said wedging elements of one of said one-way devices and each being drivingly connected to one of said concentric output shafts, each of said one-way devices having a cage member containing said wedging means, friction means connected to said cage member and in frictional engagement with said outer driven races, interlock means interconnecting the cage members of said devices and permitting limited angular displacement therebetween whereby when each of said output shafts are rotating at the same speed said drive race will engage said wedging elements with said driven races to provide positive drive to each of said output shafts and whereby said limited angular displacement of said cages will allow either of said output shafts to rotate faster than the other output shaft and release said wedging engagement whereby at all times driving torque is applied to the slower rotating output shaft.

6. A mechanism as claimed in claim 5 wherein said friction means is comprised of a resilient substantially circular spring, said spring having terminal portions in operative association with said cages.

7. A mechanism as claimed in claim 5, wherein said interlock means is comprised of a circumferentially extending slot formed in facing sides of said cages, one of said slots formed in facing sides of said cages, one of said slots being of greater circumferential length than the other, spring means comprising a resilient circular spring having terminal portions with radially extending ends thereon engaging in said slots whereby the interaction of said terminal portions and said slots provides said limited angular displacement of said cages.

8. A mechanism as claimed in claim 5 wherein said drive race has a plurality of cam means thereon and said driven races have a smooth cylindrical inner race surface thereon in engagement with said rollers.

* * * * *